(12) United States Patent
Naritomi

(10) Patent No.: US 6,180,896 B1
(45) Date of Patent: Jan. 30, 2001

(54) CONTROL PANEL HAVING SHEET-FORMED PUSHBUTTON UNIT AND METHOD OF PRODUCING THE SAME

(75) Inventor: Masanori Naritomi, Urayasu (JP)

(73) Assignee: Taisei PLas Co., Ltd., Tokyo (JP)

( * ) Notice: Under 35 U.S.C. 154(b), the term of this patent shall be extended for 0 days.

(21) Appl. No.: 09/492,953

(22) Filed: Jan. 27, 2000

(30) Foreign Application Priority Data

Jan. 27, 1999 (JP) .................................................. 11-018057

(51) Int. Cl.$^7$ ..................................................... H01H 13/70
(52) U.S. Cl. ........................... 200/5 A; 200/512; 200/517; 29/622
(58) Field of Search .............................. 29/622; 200/5 A, 200/341, 511–517, 344, 345

(56) References Cited

U.S. PATENT DOCUMENTS

| | | | | |
|---|---|---|---|---|
| 5,362,934 | * | 11/1994 | Inagaki et al. | 200/520 |
| 5,399,821 | * | 3/1995 | Inagaki et al. | 200/341 |
| 5,475,192 | * | 12/1995 | Inagaki et al. | 200/341 |
| 5,613,599 | * | 3/1997 | Inagaki et al. | 200/512 |
| 5,807,002 | * | 9/1998 | Tsai | 400/494 |
| 6,023,033 | * | 2/2000 | Yagi et al. | 200/512 |

* cited by examiner

*Primary Examiner*—Michael Friedhofer
(74) *Attorney, Agent, or Firm*—Armstrong, Westerman, Hattori, McLeland & Naughton

(57) ABSTRACT

A control panel having a sheet-formed pushbutton unit that satisfies the requirements of hermeticity, clearness of indication and operability and yet allows a cost reduction. A single-cut sheet made of a commercially available light-transmitting thermoplastic synthetic resin material is used as a substrate. Sheet recesses are formed on the single-cut sheet so that each print layer formed on the surface of the single-cut sheet is located on the inner side of the bottom of a sheet recess to prepare a formed sheet. The sheet recesses are filled with a synthetic resin material to produce a key sheet having pushbuttons. The key sheet is thermowelded to the rear side of a case cover by ultrasonic vibrational energy to form an integral unit.

3 Claims, 5 Drawing Sheets

# CONTROL PANEL HAVING SHEET-FORMED PUSHBUTTON UNIT AND METHOD OF PRODUCING THE SAME

BACKGROUND OF THE INVENTION

1. Field of the Invention

The present invention relates to a control panel having a sheet-formed pushbutton unit produced by forming a general-purpose sheet and also relates to a method of producing the control panel. More particularly, the present invention relates to a control panel having a sheet-formed pushbutton unit constructed of a formed sheet prepared by thermoforming a thermoplastic synthetic resin sheet and also relates to a method of producing the control panel.

2. Discussion of Related Art

With the recent spread of equipment related to computers and communications equipment, it has been demanded that data input units, e.g. control panels, for entering information into such equipment and receiving information therefrom should be reduced in cost to an extreme without sacrificing the operability. On the other hand, the achievement of high-precision electronic parts demands hermeticity for providing a dustproof structure and for preventing breakdown of electronic parts due to static electricity. For example, control panels used in electronic equipment, e.g. portable telephones, are required to accomplish ultimate cost reductions in order to allow these electronic devices to spread at reduced costs. Moreover, the control panels are required to improve in various mechanical and electrical functions as stated above.

To meet the demands, the present applicant proposed a control panel for electronic equipment using a sheet (see Japanese Patent Application Unexamined Publication (KOKAI) Nos. 9-259696 and 9-259697). In the proposed control panel, a mechanical assembly structure is used for the assembly of a control panel member and pushbuttons. The use of the mechanical assembly structure causes the structure of the control panel to become complicated and also causes the number of components to increase.

SUMMARY OF THE INVENTION

In view of the above-described technical background, the present invention attains the following objects.

An object of the present invention is to provide a control panel having a sheet-formed pushbutton unit in which a formed sheet produced by thermoforming a sheet is integrated with a control panel member, thereby reducing the number of process steps, and also provide a method of producing the control panel.

Another object of the present invention is to provide a control panel having a sheet-formed pushbutton unit that allows a cost reduction, and also provide a method of producing the control panel.

Still another object of the present invention is to provide a control panel having a sheet-formed pushbutton unit that is superior in mass-productivity and a method of producing the control panel.

To attain the above-described objects, the present invention provides a first control panel having a sheet-formed pushbutton unit. The control panel includes a control panel member for electronic equipment or the like. A pushbutton is inserted in an opening formed in the control panel member. A formed sheet of a thermoplastic synthetic resin material is secured to the control panel member to support the pushbutton with respect to the control panel member by elastically bending. The formed sheet is so formed as to serve as an outer skin of the pushbutton.

Preferably, the control panel member is made of a thermoplastic synthetic resin material, and the formed sheet and the control panel member are secured together into one unit by thermal joining. The term "thermal joining" means that the thermoplastic synthetic resin material is heated from the inside or outside thereof to join and secure together the two members. Specific examples of thermal joining are a method in which the thermoplastic synthetic resin material is deformed by pressing a heated member against it, and ultrasonic welding using ultrasonic vibrational energy.

In addition, the present invention provides a second control panel having a sheet-formed pushbutton unit. The control panel includes a control panel member for electronic equipment or the like. A pushbutton body is inserted in an opening formed in the control panel member. A formed sheet of a thermoplastic synthetic resin material is secured to the control panel member to support the pushbutton body with respect to the control panel member by elastically bending, the pushbutton body being secured to the formed sheet.

Preferably, the formed sheet and the control panel member are secured together into one unit by thermal joining. The term "thermal joining" means the same as the above.

In addition, the present invention provides a first method of producing a control panel having a sheet-formed pushbutton unit. According to the first method, a single-cut sheet of a thermoplastic synthetic resin material is formed to produce a plurality of recesses thereon by thermoforming to prepare a formed sheet. The recesses form pushbutton outer skins. The formed sheet is inserted into an injection mold, and a molten resin material is filled into the recesses to produce a key sheet. The key sheet and a control panel member are secured together into one unit by thermal joining.

In addition, the present invention provides a second method of producing a control panel having a sheet-formed pushbutton unit. According to the second method, a single-cut sheet of a thermoplastic synthetic resin material is thermoformed to prepare a formed sheet. The formed sheet, pushbutton bodies and a control panel member of a thermoplastic synthetic resin material are secured together by thermal joining. The term "thermal joining" means the same as the above.

The above and other objects, features and advantages of the present invention will become more apparent from the following description of the preferred embodiments thereof, taken in conjunction with the accompanying drawings.

DESCRIPTION OF THE PREFERRED EMBODIMENTS

Embodiments of the present invention will be described below with reference to the accompanying drawings.

First Embodiment

Figure 1:
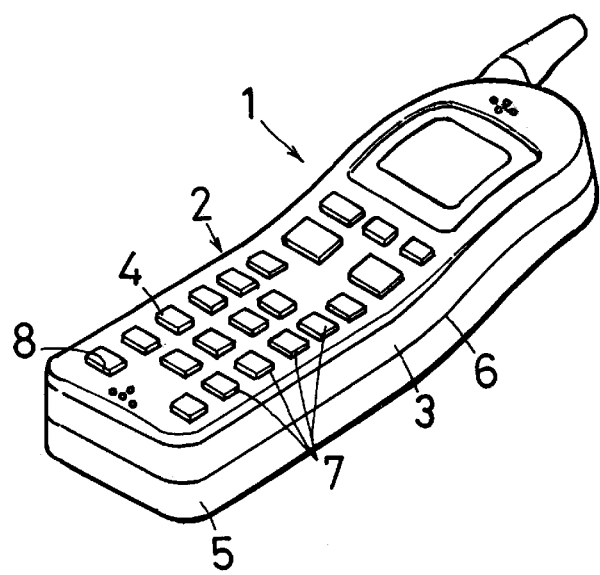
FIG. 1 is a perspective view of a portable telephone in which the present invention is used.

An example in which a control panel for electronic equipment according to the present invention is used in a portable telephone will be described below. FIG. 1 is a perspective view of a portable telephone having a control panel according to the present invention. The portable telephone 1 has a telephone body 2 made of a synthetic resin material. The telephone body 2 contains electronic equipment, e.g. an IC, for realizing the function of a telephone.

The telephone body 2 consists essentially of two parts, i.e. a case cover 3 and a back body member 5, which are divided from each other by a parting face 6 at the center thereof in the direction of the thickness. The case cover 3 is placed on the top of the telephone body 2. The back body member 5 is provided on the back of the telephone body 2. The case cover 3 performs the function of a control panel and also serves as a part of the telephone body 2. The case cover 3 has a plurality of pushbuttons 4 arranged thereon to constitute a group of keys 7. The case cover 3 and the back body member 5 are secured together into one unit by using screws, notches or other securing devices.

Printing of Indications

Figure 2:
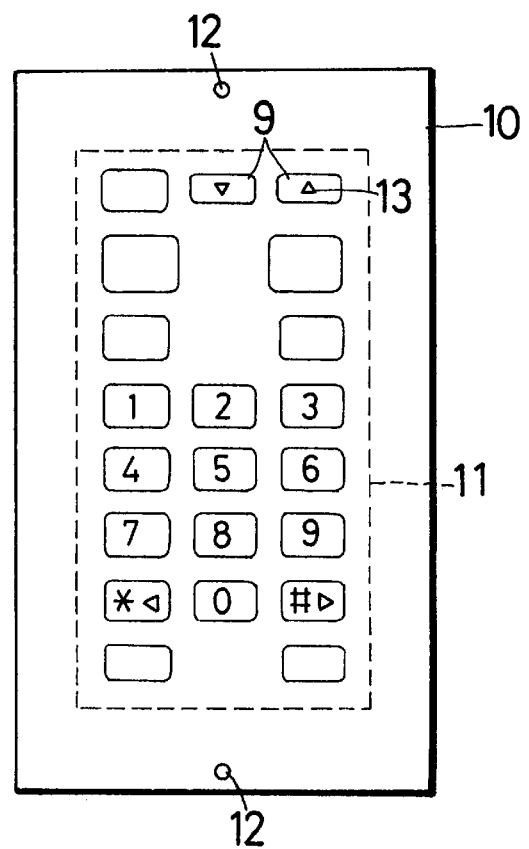
FIG. 2 is a plan view of a printed single-cut sheet serving as the outer skins of pushbuttons.

Pushbuttons 4 (described later) are provided in the case cover 3. The method of producing the pushbuttons 4 will be described below in detail. A single-cut sheet 10, which is a uniform sheet as shown in the plan view of FIG. 2, is used as the outer skins of the pushbuttons 4. The single-cut sheet 10 is a thin film of a thermoplastic synthetic resin material that is transparent or semitransparent, i.e. which has light-transmitting properties, and cut into a rectangular shape with a thickness of the order of from 0.25 mm to 0.8 mm, for example. Specific examples of thermoplastic resin materials preferable to use are polycarbonate (PC), a mixture of polybutylene terephthalate (PBT) and PC, polyethylene terephthalate (PET), PBT, ABS resin, and polyurethane (PUR). As the single-cut sheet 10, it is desirable to use a general-purpose sheet that has high tensile strength and is unlikely to tear easily and that is mass-produced by many manufacturers and commercially available at extremely low cost.

A plurality of indications 13, e.g. numerals, letters and symbols, are provided on the surface of the single-cut sheet 10. The indications 13 are printed on the single-cut sheet 10 from the rear side thereof as print layers 11. As shown in part (a) of FIG. 3, the single-cut sheet 10 is placed so that each print layer 11 on the single-cut sheet 10 faces upward (as viewed in the figure). In this state, a necessary indication 13 is printed on the rear side of a finger touch portion 9 to complete the print layer 11. It should be noted, however, that the print layers 11 may be formed by printing a ground color on the whole surface of the single-cut sheet 10 except indications 13, e.g. numerals, letters and symbols, so that the indications 13 are reversed out. Multi-color printing may also be used. Because the single-cut sheet 10 is made of a transparent material, the indications 13 can be displayed in the color of the synthetic resin material from the rear side of the single-cut sheet 10.

Printing of the print layers 11 is carried out by a known printing process, e.g. silk screen printing. Because the single-cut sheet 10 is flat, printing on the surface of the single-cut sheet 10 can be performed easily without the need of a special device. The single-cut sheet 10 has positioning holes 12 provided in the upper and lower ends thereof. To use portions of the single-cut sheet 10 that correspond to the print layers 11 as a group of keys, these portions are formed in the shape of protuberances by thermoforming (described later) so as to form finger touch portions 9 when the rear sides of the print layers 11 are formed as pushbuttons 4.

Thermoforming

Figure 3:
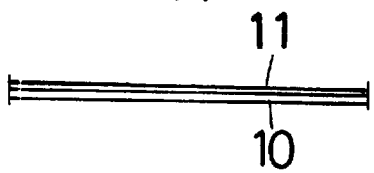
FIGS. 3(*a*)–(*d*) are diagrams illustrating a process of thermoforming a single-cut sheet into a formed sheet.
Figure 3:
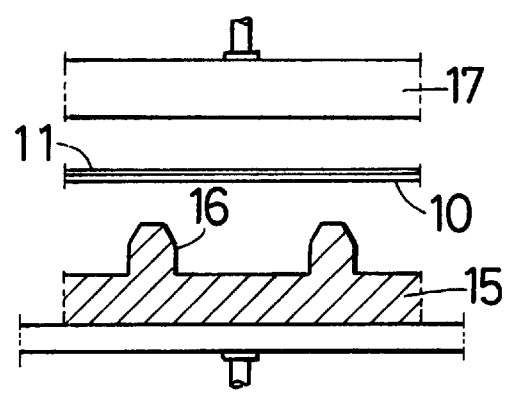
Figure 3:
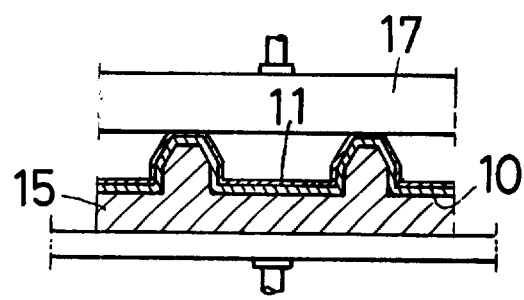
Figure 3:
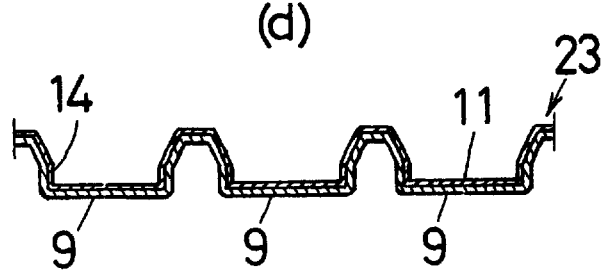

Next, the forming procedure carried out when the key sheet is formed by pressure forming will be described. Parts (a) to (d) of FIG. 3 are diagrams illustrating the process sequence of forming recesses on the single-cut sheet 10 that form the rear sides of protuberances formed as the finger touch portions 9. The printed single-cut sheet 10 is placed over a mold 15 so that the print layers 11 on the single-cut sheet 10 face upward. As shown in part (b) of FIG. 3, the single-cut sheet 10 is placed over the mold 15 such that a thermoforming recess 16 formed in the mold 15 lies directly below each print layer 11 on the single-cut sheet 10. A heating plate 17 having a flat mating surface is placed directly above the mold 15.

As shown in part (c) of FIG. 3, the single-cut sheet 10 is placed on the upper side of the mold 15 by engaging positioning pins (not shown) in the positioning holes 12 of the single-cut sheet 10 so that the print layers 11 of the single-cut sheet 10 correspond respectively to the thermoforming recesses 16 of the mold 15. Then, the heating plate 17 is pressed against the upper side of the single-cut sheet 10 to soften the single-cut sheet 10 by heating.

Compressed air not higher than 0.1 MPa is supplied to the upper side of the softened single-cut sheet 10 from the heating plate 17 side, and while doing so, the air in the thermoforming recesses 16 is evacuated from the lower side of the mold 15 to suck the lower side of the single-cut sheet 10. By the suction and heating, a plurality of sheet recesses 14 corresponding respectively to the print layers 11 are formed. Thus, as shown in part (d) of FIG. 3, each print layer 11 of the single-cut sheet 10 is located on the inner side of the bottom of a sheet recess 14 (i.e. on the rear side of a protuberance), and the surface of the sheet recess 14 on the side opposite to the side on which the print layer 11 is located is formed as a finger touch portion 9 of a pushbutton 4, that is, the outer skin of the pushbutton 4. Thus, a formed sheet 23 is prepared.

It should be noted that the finger touch portion 9 is formed in any desired shape, e.g. a square, circular or oval shape, in conformity to the shape of the pushbutton 4. The thermoforming of the single-cut sheet 10 is not necessarily limited to pressure forming but may be vacuum forming in which a thermoplastic sheet is fixed on a mold and softened by heating with a heater, and the softened sheet is pressed against the mold by a vacuum, thereby forming the sheet into a desired shape. It is also possible to perform thermoforming using a heating plate 17 formed with protuberances. That is, the protuberances of the heating plate 17 are inserted into the respective recesses of the mold 15.

Injection Molding of Key Interior

Figure 4:
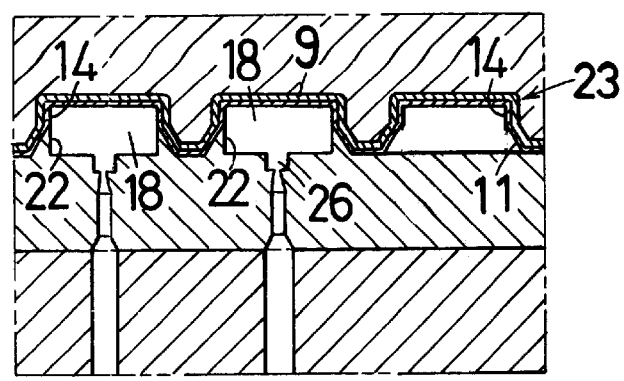
FIGS. 4(*a*)–(*c*) are sectional views showing a process of producing a key sheet from a formed sheet.
Figure 4:
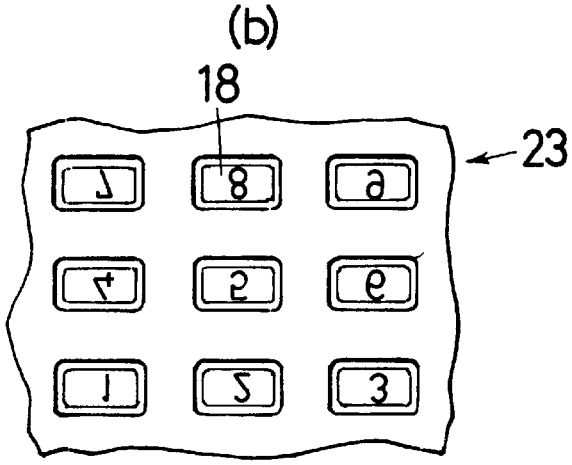
Figure 4:
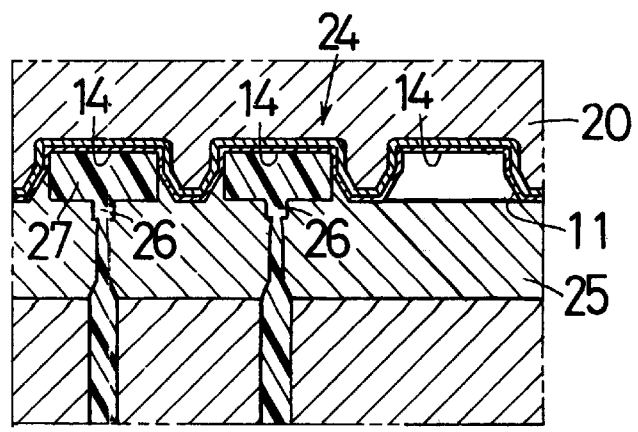

Parts (a) to (c) of FIG. 4 are diagrams illustrating a process in which each sheet recess 14 formed on the formed sheet 23 is filled with a resin material by injection molding. As shown in part (a) of FIG. 4, the finger touch portions 9 of the formed sheet 23 formed with a plurality of sheet recesses 14 are inserted into cavity recesses 22 formed in a cavity 18 of a movable retainer plate 20. The formed sheet 23 is placed on the movable retainer plate 20 or a stationary retainer plate 25 with the finger touch portions 9 inserted in the cavity recesses 22, and in this state the two retainer plates are pressed against each other. When the movable retainer plate 20 and the stationary retainer plate 25 are held together under pressure, gates 26 in the stationary retainer plate 25 communicate with the respective sheet recesses 14 of the formed sheet 23.

Part (b) of FIG. 4 shows the mating surface of the movable retainer plate 20. As shown in part (c) of FIG. 4, a molten resin material 27 is supplied into each sheet recess 14 of the formed sheet 23 through a gate 26. The molten resin material 27 is filled into the sheet recesses 14 so as to be flush with the surface of the formed sheet 23. Thus, a key sheet 24 having a group of protuberant keys 7 is completed. It should be noted, however, that the inside of a part of sheet recesses 14 is left hollow.

A desired synthetic resin material is selected to be filled in the sheet recesses 14 according to the characteristics required for the pushbuttons, e.g. an engineering plastic material or a synthetic resin elastomer. As the material of the formed sheet 23 and the molten resin material 27 to be injected, it is preferable to use synthetic resin materials that thermoweld to each other.

Integration of Keys Into Control Panel

Figure 5:
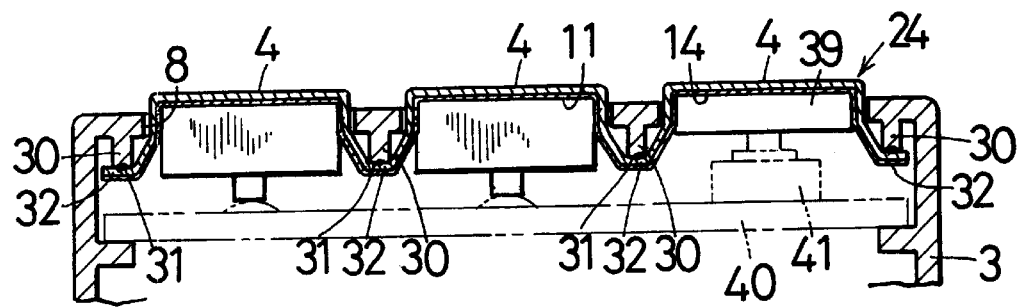
FIG. 5 is a sectional view showing the structure of a control panel for electronic equipment according to a first embodiment of the present invention.

Next, a method of integrating the completed key sheet 24 into the control panel will be shown. FIG. 5 is a sectional view showing the way in which the key sheet 24 is secured to a control panel for electronic equipment according to a first embodiment. The key sheet 24 is inserted into the case cover 3 so that each pushbutton 4 of the key sheet 24 projects from an opening 8 of the case cover 3. A rib 30 is formed on the rear side in the case cover 3 so as to surround each opening 8.

A secured portion 32 of the key sheet 24 is thermowelded to an end surface 31 of the rib 30. The thermowelding is ultrasonic welding. In ultrasonic welding, ultrasonic vibrational energy as applied to the secured portion 32 is converted to mechanical vibrations at the joint area between the end surface 31 of the rib 30 and the key sheet 24, which generate frictional heat at the joint area, melting the end surface 31 and the key sheet 24 and allowing them to weld together at the joint area.

Figure 6:
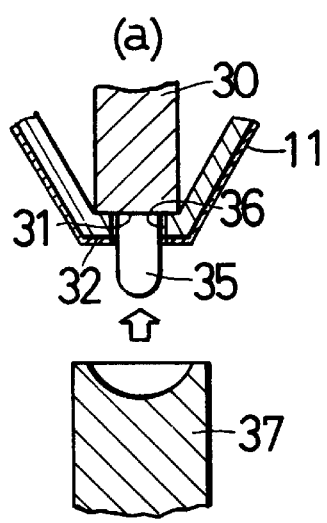
FIGS. 6(*a*) and (*b*) are sectional views showing a structure in which a key sheet and a case cover are secured together by hot staking.
Figure 6:
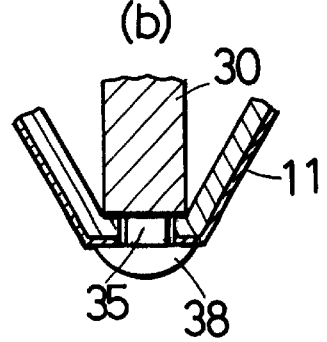

FIG. 6 shows an example in which the joint of the end surface 31 of the rib 30 and the key sheet 24 is effected by hot staking. A projection 35 is formed on the end surface 31 of the rib 30. An opening 36 has previously been formed in the secured portion 32 of the key sheet 24. To integrate the key sheet 24 into the case cover 3, the projection 35 is inserted into the opening 36 of the key sheet 24. Next, the distal end of the projection 35 is deformed by pressing with a heated staking tool 37 to form a staked portion 38 for joining together the case cover 3 and the key sheet 24.

A plurality of staked portions 38 are provided around the respective openings 8. The case cover 3 and the key sheet 24 are integrated into one unit. Moreover, the joint of the end surface 31 of the rib 30 and the key sheet 24 is effected by thermowelding. Therefore, there is no possibility of a foreign matter or moist air entering the inside of the electronic equipment from the outside. An actuator 39 is inserted into a sheet recess 14 of the key sheet 24 where no resin material is filled. The pushbutton 4 drives a switching device 41 or the like mounted on a printed-circuit board 40 through the actuator 39.

Second Embodiment

Figure 7:
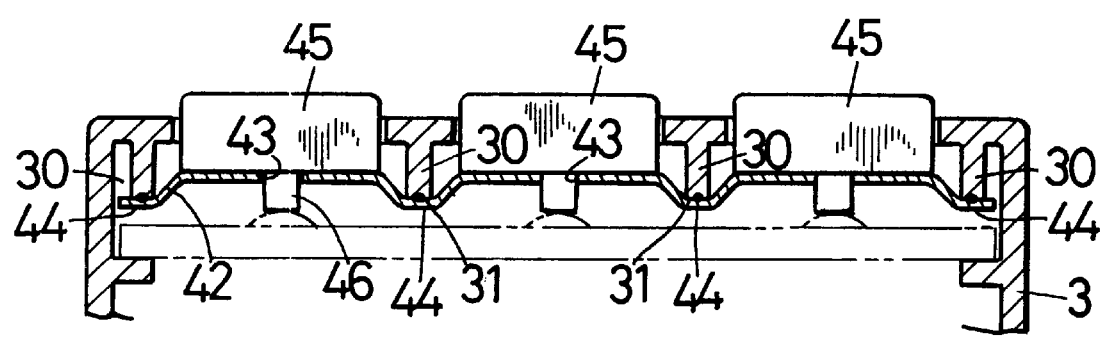
FIG. 7 is a sectional view showing the structure of a control panel for electronic equipment according to a second embodiment of the present invention.

FIG. 7 shows a second embodiment of the present invention, which is a sectional view showing another key sheet as secured to a control panel for electronic equipment. In the key sheet 24 according to the foregoing first embodiment, the body portion is filled in each pushbutton 4 by injection molding. In the second embodiment, pushbutton bodies 45 are produced in another process in advance and secured to a formed sheet 42 by welding. A single-cut sheet 10 is formed into a shape having a sectional structure as shown in FIG. 7 by thermoforming as stated above to obtain a readily deflectable formed sheet 42.

Meanwhile, pushbutton bodies 45 are molded of a material such as an engineering synthetic resin material in advance and cut off from each other individually. A cylindrical actuator 46 is integrally formed on the lower side of each pushbutton body 45. The formed sheet 42 subjected to thermoforming is provided with openings 43 at respective positions corresponding to the pushbutton bodies 45. The actuators 46 of the pushbutton bodies 45 are inserted into the openings 43. Secured portions 44 of the formed sheet 42 are thermowelded to the respective end surfaces 31 of the ribs 30 of the case cover 3. Similarly, the lower side of each pushbutton body 45 is thermowelded to the upper side of the formed sheet 42. It is desirable to use ultrasonic welding for these thermowelding processes. However, it is also possible to use hot staking as stated above.

Other Embodiments

Although in the foregoing embodiments an example in which pushbuttons are provided on the case cover of a portable telephone has been described, the present invention is not necessarily limited thereto but may also be applied to other members as long as they similarly perform the function of supporting pushbuttons. In the present invention, therefore, these members are generally called "control panels". It should be noted that in the second embodiment indications are printed on the formed sheet 42 by the above-described method. Alternatively, indications are printed on the upper or lower sides of the pushbutton bodies 45.

In a case where indications are printed on the formed sheet 42, the pushbutton bodies 45 are preferably formed by using a transparent material. In a case where the formed sheet 42 having print layers and the pushbutton bodies 45 are joined together by ultrasonic welding, it is preferable to mix a primer agent into the print layers with a view to improving weldability.

In the foregoing embodiment, the end surface 31 of the rib 30 of the case cover 3 and the secured portion 32 of the key sheet 24 are secured together by ultrasonic welding. However, the process may be such that the rib 30 is previously coated with a primer, e.g. a silicon primer, and the key sheet 24 and the case cover 3 are thermowelded with the primer interposed therebetween. When injection molding is carried out under conditions where the temperature of the molten resin material for injection molding is low, the key sheet 24 and the case cover 3 may be bonded together by an adhesive action in place of thermowelding.

In this case, an adhesive is applied to the rib 30 of the case cover 3 in advance, and the rib 30 and the secured portion 32 of the key sheet 24 are bonded together. At this time, the key sheet 24 and the case cover 3 are bonded together mainly by an adhesive action, not by thermowelding. Accordingly, the material of the case cover 3 is not necessarily limited to engineering plastic materials, but other materials may be used, for example, a magnesium alloy formed by injection molding, a metal sheet formed by plastic forming, and a die casting alloy formed by die casting.

In the foregoing embodiment, the distal end of the projection 35 is deformed by pressing with the heated staking tool 37 to form a staked portion 38 for joining together the case cover 3 and the key sheet 24. In a case where the case cover 3 is a metal, the staking tool 37 need not be heated but may be an ordinary staking tool 37. The staking tool 37 causes a part of the projection 35 to be plastically deformed, thereby securing the key sheet 24 to the case cover 3.

As has been detailed above, the present invention allows a control panel exhibiting excellent hermeticity to be produced in a reduced number of process steps. Because the indication of each pushbutton is covered with the outer skin and positioned on the rear side, it is possible to prevent the indication from being stained or separated by the touch with a finger or the like.

It should be noted that the present invention is not necessarily limited to the foregoing embodiments but can be modified in a variety of ways without departing from the gist of the present invention.

What is claimed is:

1. A method of producing a control panel having a sheet-formed pushbutton unit, said method comprising the steps of:

forming a single-cut sheet of a thermoplastic synthetic resin material to produce a plurality of recesses thereon by thermoforming to prepare a formed sheet, said recesses forming pushbutton outer skins;

inserting said formed sheet into an injection mold and filling a molten resin material into said recesses to produce a key sheet; and securing said key sheet and a control panel member together into one unit by thermal joining.

2. A method of producing a control panel having a sheet-formed pushbutton unit according to claim 1, wherein said thermal joining is ultrasonic welding using ultrasonic vibrational energy.

3. A method of producing a control panel having a sheet-formed pushbutton unit according to claim 1, wherein said control panel member is made of a metal, and said formed sheet and said control panel member are secured together into one unit by staking in which said control panel member is plastically deformed.

* * * * *